(12) United States Patent
Gordon

(10) Patent No.: US 6,531,998 B1
(45) Date of Patent: Mar. 11, 2003

(54) HAPTIC FEEDBACK GAMING DEVICE WITH INTEGRAL POWER SUPPLY

(75) Inventor: Gary L. Gordon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/514,663

(22) Filed: Feb. 29, 2000

(51) Int. Cl.[7] .................................................. G09G 5/00
(52) U.S. Cl. ............................ 345/156; 463/38; 363/21
(58) Field of Search ........................... 463/30, 37, 38; 273/148 R; 345/156, 161, 163, 167; 363/21; 364/190

(56) References Cited

U.S. PATENT DOCUMENTS

| | | | | |
|---|---|---|---|---|
| 5,517,397 A | * | 5/1996 | Quek et al. ................... 363/21 |
| 5,654,740 A | * | 8/1997 | Schulha ....................... 345/156 |
| 5,691,898 A | * | 11/1997 | Rosenberg et al. ......... 345/161 |
| 5,864,473 A | * | 1/1999 | Slack et al. ................... 363/21 |
| 5,929,607 A | | 7/1999 | Rosenberg et al. ......... 320/166 |

* cited by examiner

*Primary Examiner*—Kent Chang
*Assistant Examiner*—Tom V. Sheng
(74) *Attorney, Agent, or Firm*—Ronald M. Anderson

(57) ABSTRACT

A haptic gaming device includes an integral internal power supply adapted to be connected directly to alternating current (AC) line power. The haptic gaming device, a disclosed example of which is a force feedback joystick, provides a feedback force to a user gripping a control handle of the device. The force on the control handle is produced by one or more electrical motors within the base of the device. Electrical power for the motors is provided by the integral internal power supply and is regulated to accommodate a relatively wide range of input AC line voltage. The power supply includes a pulse width modulated switching control that produces pulses of direct current (DC), which are applied to a first primary winding of a transformer in the power supply. A second primary winding in the transformer produces a feedback signal employed to control a pulse width modulated switching (PWM) control, which varies a width of the DC pulses applied to the first primary winding so that the voltage output from a secondary winding of the transformer remains within a desired range. Because the integral internal power supply is relatively compact and includes only a few components, it has a low cost and readily fits within the base of the joystick.

9 Claims, 2 Drawing Sheets

HAPTIC FEEDBACK GAMING DEVICE WITH INTEGRAL POWER SUPPLY

FIELD OF THE INVENTION

The present invention generally relates to a haptic gaming device, and more specifically, to a power supply for a haptic feedback gaming device, such as a force-feedback joystick.

BACKGROUND OF THE INVENTION

Electronic devices used with conventional personal computers (PCs) are typically energized through a connection to a port on the PC, or by using batteries, or by connection to an alternating current (AC) line power source. Battery power supplies are generally less desirable for devices that consume more than a few milliwatts of power, due to the size of the battery supply required for continuously energizing the device and because of the cost and inconvenience associated with charging or replacing batteries. If such an electronic device is relatively small and compact, it is common practice to supply the required electrical current from a power supply module (commonly referred to as a "power brick") that directly plugs into an AC wall outlet. If the power brick is too large to conveniently and directly plug into an AC outlet, a short line cord may be provided to connect the power brick to the outlet. The output current from the power brick, which is typically a direct current (DC), is then connected to the electronic device through a small gauge cable. By using this type of power source, the power transformer and other components typically employed for a power supply need not be included in the electronic device. The electronic device can thus be smaller and more portable than would be the case if the power supply were integrally included in the device. In many cases, it would simply not be possible to include the components used in a power supply integrally within the electronic device because of size and weight limitations.

Haptic gaming devices, such as force feedback joysticks and force feedback wheels, are examples of one type of electronic device that is normally energized with an electrical current provided by a power brick. A force feedback joystick typically includes a control handle that is pivotally mounted to a base so as to enable motion in at least two orthogonal directions. Included within a housing of the joystick is at least one electric motor that must be energized with an electrical current to provide the force feedback response. The power requirement for the electrical motors used in these devices is normally too great to supply from a port (RS-232 serial port, parallel port, game port, or universal serial bus (USB) port) of a PC and must instead be supplied by a separate power supply that is connected to an AC line. Furthermore, due to the need to minimize the size of the base of a force feedback joystick, and the need to insure that it is relatively lightweight and portable, since a user frequently picks up the joystick and moves it about during game play, all force feedback joysticks known in the prior art have obtained the electrical current needed to energize the force feedback motors from an external power brick that is connected to the AC line.

It has generally been held that the required electrical current for energizing force feedback motors in a haptic gaming device is too great to be supplied from an integral power supply disposed within the housing of the device. The size and weight of the components used in a typical power supply, if included within the housing of a haptic gaming device such as a joystick, would indeed cause it to be unacceptably large and heavy. While other types of power supplies that are capable of supplying the required current and are smaller in volume than a conventional power brick are known in the prior art, such power supplies have generally been considered to be too expensive for use in a consumer haptic gaming device, since it is important to minimize the cost of such devices to remain viable in a competitive market.

Newer haptic gaming devices require even more electrical power to improve the response of the electrical motors to force feedback commands. Providing the increased power from a conventional power brick that plugs directly into an AC outlet is not practical due to the greater size of components such as the transformer that would be required to provide the power. Also, it is desirable to reduce the overall weight of the haptic gaming device and all of its associated components, such as the power supply, to minimize shipping costs of the product in the distribution network. Accordingly, a different type of power supply is required that is low in cost, uses relatively few parts, and is very compact. Ideally, the power supply should be integral with the haptic gaming device to eliminate the need for a separate modular power supply component, and the weight and volume associated with packaging and shipping such a component with the force feedback joystick or other haptic gaming device. Currently, there are no haptic gaming devices that include an integral power supply meeting these requirements.

SUMMARY OF THE INVENTION

In accord with the present invention, a haptic gaming device is defined that includes a housing in which is disposed a prime mover used to produce a force feedback. Disposed within the housing is a control for the prime mover and an integral power supply for the prime mover. The integral power supply, which is adapted to couple to an alternating current (AC) line power source, provides power to the prime mover to energize it.

The power supply includes a rectifier that converts the AC line power to a direct current (DC) voltage. A transformer in the power supply is coupled to the rectifier to receive the DC voltage, and an electronic switching circuit is included to respond to a feedback signal produced by the transformer and to periodically connect the rectifier to the transformer so that the transformer is supplied with a pulsed DC voltage.

The transformer preferably includes two primary windings and a secondary winding. One of the primary windings provides the feedback signal for controlling the electronic switching circuit and the other primary winding is energized by the pulsed DC voltage. The electronic switching circuit also preferably comprises a pulse width modulator (PWM) switching control that periodically interrupts the DC voltage applied from the rectifier to the transformer at a predetermined frequency and varies a duty cycle of the pulsed DC voltage thus produced to maintain an output voltage on the secondary winding of the transformer within a predetermined range. This output voltage is coupled to the prime mover, to energize it. In a preferred embodiment of the present invention, the PWM switching control maintains the output voltage of the transformer within the predetermined range for an input AC line voltage that varies by more than 100 volts.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
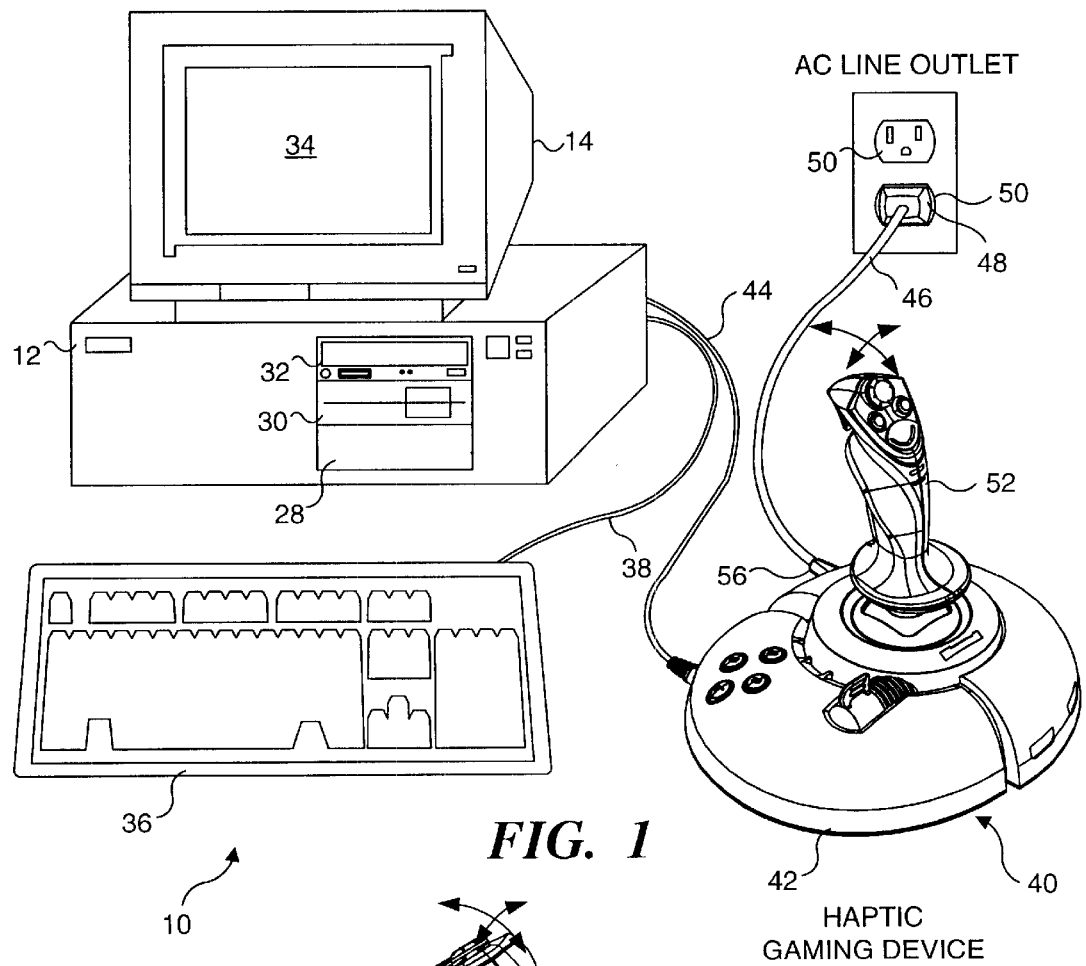
FIG. 1 is an isometric view of a personal computer, and a haptic joystick in accord with the present invention.

FIG. 1 illustrates a generally conventional personal computer system 10, with which the present invention is usable. Personal computer system 10 includes a processor chassis 12 and a monitor 14. Included within processor chassis 12 are a motherboard (not shown), a hard drive 28, a floppy disk drive 30, and an optical storage device 32, which may include either a compact disk-read only memory (CD-ROM) drive, or a DVD drive. Monitor 14 includes a display 34 on which graphics and text are viewed by a user. For example, during play of a computer game, the graphic components of the game are rendered on display 34, as will be well known to those of ordinary skill in the art. Personal computing system 10 also includes a keyboard 36 for input of text and commands to processor chassis 12 through a cable 38, which is connected either to a universal serial bus (USB) port or a personal system/2 (PS/2) port provided on the rear of the processor chassis.

In the preferred embodiment shown in FIG. 1, the haptic gaming device is a force feedback joystick 40 that includes a base 42, which is coupled through a cable 44 to one of the USB ports on processor chassis 12. Power for joystick 40 is provided through an AC line cord 46, a distal end of which includes a conventional AC plug 48. AC plug 48 is inserted into a conventional AC line outlet receptacle 50, which provides a nominal 115 volts AC at 60 Hz in the United States and certain other countries. In many foreign countries, the AC line voltage may be between 200 and 240 volts, and the frequency of the AC line current either 50 or 60 Hz. It is also well understood that the AC line voltage can deviate from within these two nominal ranges by a considerable amount based on local conditions that effect the voltage level delivered by the local utility company to a particular AC line outlet receptacle.

Figure 2:
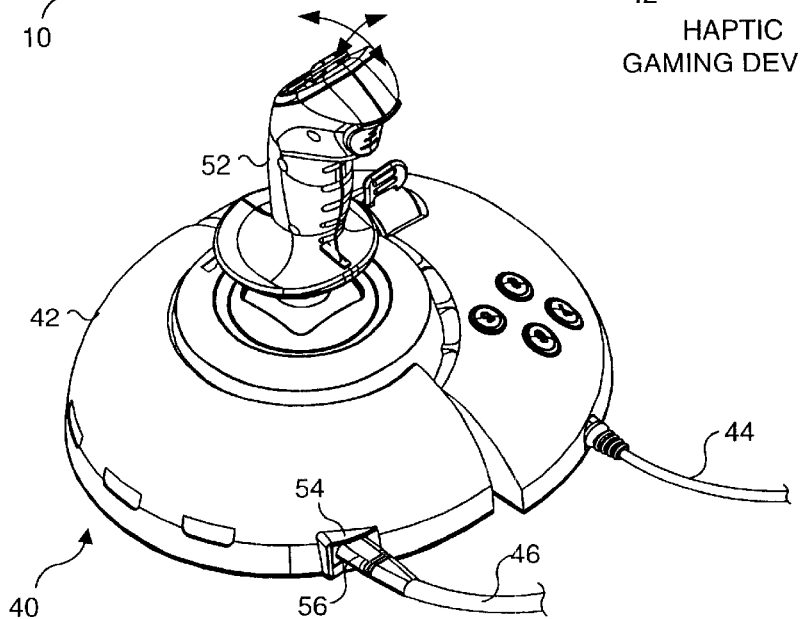
FIG. 2 is a rear elevational view of the haptic joystick of FIG. 1.

The proximal end of AC line cord 46 includes a female plug 56, which is inserted into an AC cord receptacle 54 provided on a rear portion of base 42, as shown in FIG. 2. For purposes of controlling gaming objects or other types of object that move about in the image on display 34, joystick 40 includes a control handle 52, which in this embodiment is pivotable relative to base 42 in the X and Y planes (i.e., about the X and Y axes), and which is also rotatable about the Z axis that extends longitudinally through a center of the control handle. By moving the control handle relative to the X, Y, and/or Z axes, the user provides input to control a game or other software program executed by personal computer system 10. Other details of joystick 40 are not discussed here, since they are not particularly relevant to the present invention.

In response to program instructions in a game or other software program executed by personal computer system 10, a desired haptic feedback is applied to control handle 52, so that the user experiences a force through control handle 52 while the handle is being gripped in the hand of the user (not shown). Such forces typically relate to an interaction between objects in the application program being executed by the personal computer system. For example, if the joystick is being used to control the movement and direction of a vehicle in a game, the terrain over which the vehicle in the application program is traveling may be "felt" by the user through a haptic feedback force applied to the user's hand through control handle 52. The user will also be able to experience a resistive force when the user moves the control handle so as to cause the simulated vehicle to veer into a wall. These and other kinds of haptic forces that can be implemented using joystick 40 are well known to those of ordinary skill in this art.

As noted above, in the background of the invention, haptic gaming devices such as joystick 40 typically include one or more electrical motors used as prime movers for developing the feedback force experienced by the user of the haptic gaming device. Electrical motors require substantially more current than can be provided through a conventional USB port or other types of ports on the personal computer system. However, instead of obtaining the electrical power needed to energize the electrical motors employed in joystick 40 from a power module or power brick that is plugged into AC line outlet receptacle 50, the present invention enables joystick 40 to be directly energized by connection to AC line voltage. The power required by the joystick is supplied through AC line cord 46, thereby eliminating the need to provide an external power brick, as has been conventionally necessary in regard to prior art haptic gaming devices. Although joystick 40 only includes two electric motors for providing the haptic feedback force, it is contemplated that other types of haptic gaming devices in accord with the present invention may alternatively be provided with either only one motor or with more than two motors energized by a direct connection of the haptic gaming device to AC line output receptacle 50.

Figure 3:
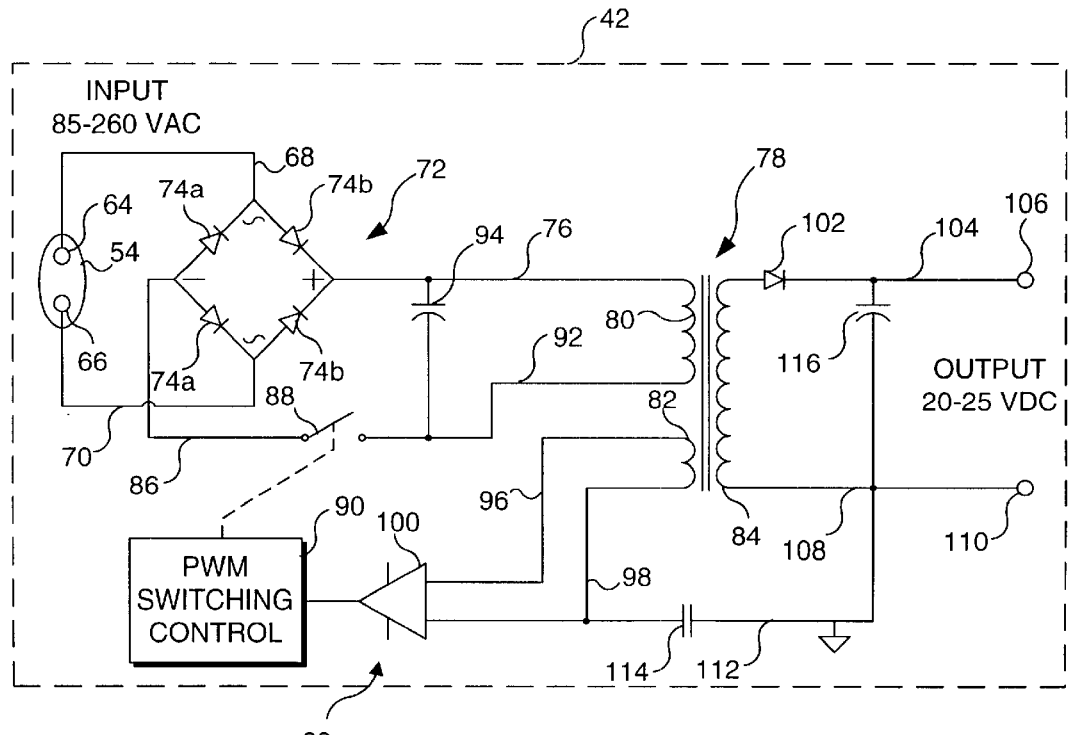
FIG. 3 is a schematic circuit diagram of an integral power supply for use in a haptic gaming device, such as the haptic joystick of FIG. 2.

FIG. 3 illustrates details of an integral internal power supply 60 disposed within base 42 of joystick 40, which employs only a few components to provide DC power to energize the prime movers used to produce the haptic force feedback. Integral internal power supply 60 is relatively compact so that it readily fits within base 42 (or within other haptic gaming devices that use it to provide the power to energize one or more prime movers). Integral internal power supply 60 receives its input power directly from AC receptacle 54, which includes pins 64 and 66. Pin 64 is connected through a conductor 68 and pin 66 through a conductor 70, to the input of a full wave rectifier 72. Full wave rectifier 72 includes two pair of diodes 74a and 74b. The cathodes of diodes 74a and the anodes of diodes 74b are coupled to conductors 68 and 70. Full wave rectifier 72 produces a DC output signal having a positive polarity on a lead 76 and a negative polarity on a lead 86. Lead 76 is connected to a primary winding 80 in a transformer 78, which also includes a primary winding 82 and a secondary winding 84. Lead 76 connects to one end of primary winding 80, while a lead 92 connects to the other end. A capacitor 94 is coupled between leads 76 and 92, and filters the DC signal produced by full wave rectifier 72. Lead 92 is connected to an electronic switch 88 that periodically interrupts the flow of DC current through primary winding 80, so that the primary winding is energized with a series of DC pulses.

Electronic switch 88 is connected between leads 86 and 92 and is controlled by an output signal from a pulse width modulated (PWM) switching control 90. The frequency at which electronic switch 88 is periodically opened and closed remains relatively constant, but the period of time that the electronic switch is closed is varied to change the width of the DC pulse supplied to energize primary winding 80 of transformer 78. The purpose of varying the pulse width of this DC pulse is to accommodate a relatively wide range of input AC voltage, by reducing the pulse width as the AC voltage that is input increases. In the preferred embodiment, this input voltage can vary between 85 and 260 volts AC.

In response to the DC pulses applied to primary winding 80, primary winding 82 produces a feedback signal that is conveyed on leads 96 and 98 to the input of a comparator 100. Comparator 100 thus produces an output signal that is a function of the voltage developed across primary winding 82. The voltage from comparator 100 is input to PWM switching control 90, causing it to vary the pulse width, i.e. the time that electronic switch 88 is in its closed state. By varying the pulse width, the output voltage produced in secondary winding 84 is controlled within a range of 20 to 25 volts DC over an input voltage range of 85 to 260 volts AC. The voltage developed on secondary winding 84 is a pulsating AC, induced by the pulsating DC applied to primary winding 80. A diode 102, which has its anode connected to secondary winding 84, rectifies the pulsating AC induced on the secondary winding, and a capacitor 116, which is connected between leads 104 and 108, filters the rectified signal from diode 102, producing the output signal supplied to energize the one or more electrical motors in the haptic gaming device, at terminals 106 and 110. Lead 108 is connected between one end of secondary winding 84 and terminal 110 and is also connected to ground through a lead 112. A capacitor 114 that is connected between leads 98 and 108 shunts any high frequency on lead 98 to ground.

It has been contemplated, that as an alternative, the voltage level developed on secondary winding 84 could be used to provide the feedback signal used to control the pulse width of the output signal from PWM switching control 90. Although the direct feedback of the secondary voltage amplitude might enable a more closely regulated output on the secondary winding of the transformer, it would likely increase the cost of the power supply, and is therefore less desirable in this case.

Figure 4:
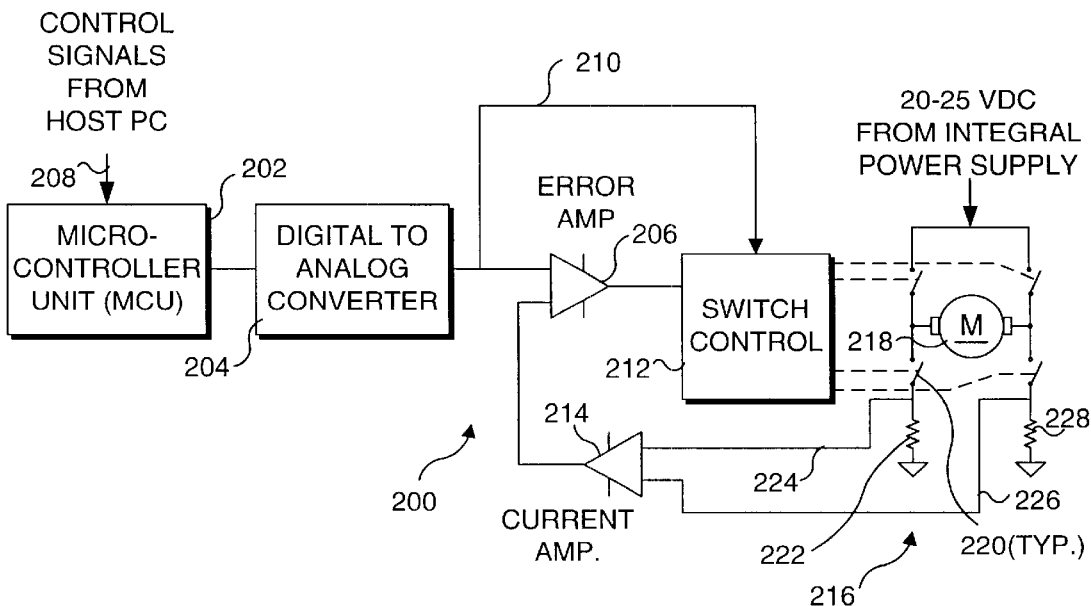
FIG. 4 is a schematic block diagram showing the motor control circuit that determines how the current provided by the present invention is applied to energize a motor in a haptic gaming device such as a joystick.

The output signal developed by integral internal power supply 60 between terminal 106 and terminal 110, which is at ground potential, is applied to an H-switching bridge 216, which controls the application of drive current to an electric motor 218. Although only one motor 218 is illustrated in FIG. 4, it will be understood that additional electric motors are controlled by control circuits 200 like that shown in FIG. 4. The switching bridge includes four electronically controlled switches 220, which are preferably metal oxide semiconductor (MOS) devices, although other suitable electronic switches can alternatively be used.

Control circuit 200 includes an Digital to Analog Converter 204 that receives a digital control signal from a Micro Controller Unit (MCU) 202. The MCU is disposed within the haptic gaming device, e.g., within base 42 of joystick 40 and produces the control signals in response to commands from personal computer system 10 (shown in FIG. 1). In response to the control signal, Digital to Analog Converter 204 produces a control voltage that is proportional to the magnitude of current to be applied to motor 218.

An error amp 206 compares and amplifies the differential voltage applied to its input terminals. One of these inputs is from Digital to Analog Converter 204 and the other is the output from a current amplifier 214. Current amplifier 214 produces its output by amplifying the differential voltage developed across resistors 222 and 228, which are coupled between the electronic switches used to control current flow through motor 218 and ground. Only two of the four electronically controlled switches are closed at one time (i.e., the upper left and lower right, or the upper right and lower left electronically controlled switches), and the input signal applied to current amplifier 214 from resistors 222 and 228 is thus indicative of the current flowing through motor 218. Accordingly, error amplifier 206, which responds to the difference between the current commanded to flow through motor 218 and the actual current flowing through the motor, produces an error signal that is applied to a switch control 212 to ensure that the control signal received from the Digital to Analog on a line 210 result in the appropriate magnitude and direction of electrical current output from internal integral power supply 60 being applied to motor 218.

In the preferred embodiment disclosed herein, integral internal power supply 60 only provides electrical current to energize one or more electrical motors 218. If AC electrical power is either not provided to integral internal power supply 60, or the flow of electrical current to the internal electrical supply is interrupted from the AC line, joystick 40 can still provide input signals to the personal computer system when the control handle of the joystick is moved by the user, although the haptic feedback force will no longer be applied to control handle 52, since the prime movers will not be energized. It is also possible to use the integral internal power supply to provide electrical power for other control components within the haptic gaming device, but sufficient power for these other components is typically available from the port to which the haptic gaming device is connected on the personal computer system.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A haptic gaming device comprising:
   (a) a housing in which a prime mover used to produce a force feedback is disposed;
   (b) a control for the prime mover that is disposed within the housing; and
   (c) an integral power supply for the prime mover that is disposed within the housing and is adapted to couple to an alternating current (AC) line power source, said integral power supply providing power to the prime mover to energize it, and said power supply comprising:
      (i) a rectifier that converts AC line power to a direct current (DC) voltage;
      (ii) a transformer coupled to the rectifier to receive the DC voltage, wherein the transformer includes two primary windings and a secondary winding, one of the primary windings providing a feedback signal; and
      (iii) an electronic switching circuit that responds to the feedback signal produced by the transformer and periodically connects the rectifier to the transformer so that the transformer is energized with a pulsed DC voltage, said electronic switching circuit including a pulse width modulator (PWM) switching control that periodically interrupts the DC voltage applied from the rectifier to the transformer at a predetermined frequency and varies a duty cycle of the pulsed DC voltage to maintain an output voltage from the transformer that is coupled to the prime mover within a predetermined range for an input AC line voltage that can vary by more than 100 volts.

2. A haptic gaming device having an integral power supply, comprising:

(a) a housing for the haptic gaming device, said housing enclosing an electrically energized prime mover that produces a haptic force when energized;

(b) a first rectifier disposed within the housing and connected to an input port on the housing, for input of an alternating current (AC) line voltage, said first rectifier converting the AC line voltage to a direct current (DC) voltage;

(c) a transformer disposed within the housing having a first primary winding coupled to receive the DC voltage from the first rectifier, a secondary winding, and a second primary winding that produces a feedback signal indicative of a voltage produced on the secondary winding;

(d) an electronically controlled switch disposed within the housing and connected in series between the first rectifier and the first primary welding of the transformer; and (e) a pulse width modulated (PWM) switching control disposed within the housing and coupled to the second primary winding of the transformer, said PWM switching control producing a switch control signal that changes state at a predefined frequency and is connected to the electronically controlled switch, causing the electronically controlled switch to modulate the DC voltage that is applied to the first primary winding from the first rectifier, said DC voltage having a pulse width that is a function of the feedback signal applied to the electronically controlled switch, to control a magnitude of a voltage developed on the secondary winding of the transformer to energize the prime mover such that the electronically controlled switch regulates the voltage developed on the secondary winding of the transformer within a range of about 20–25 volts DC for an input AC line voltage within a range of about 85 to about 260 volts AC.

3. The haptic gaming device of claim 2, further comprising a second rectifier disposed within the housing and connected to the secondary winding of the transformer, said second rectifier producing a rectified DC output signal from the voltage developed on the secondary winding of the transformer for use in energizing the prime mover.

4. The haptic gaming device of claim 3, further comprising a filter coupled to the secondary winding of the transformer for filtering the rectified DC supplied to energize the prime mover.

5. A haptic gaming device adapted to couple to a host computer on which a software game is executed and which produces a force perceived by a user in response to the software game, comprising:

(a) a housing comprising a base for the haptic gaming device, said base supporting an object that is manipulated by a user to produce a game control signal for input to the host computer to control the software game and through which a force is applied that is perceivable by the user;

(b) a prime mover that is coupled to the object to provide the force that is perceivable by the user; and (c) a power supply that is integrally housed within the base and is adapted to directly connect to an alternating current (AC) line outlet to receive an AC line voltage, said power supply providing an electrical current to energize the prime mover, and said power supply comprising:

(i) a full-wave rectifier that is coupled to receive the AC line voltage, converting it to a direct current (DC) voltage; and (ii) a multi-winding transformer having a primary winding, a secondary winding, and another primary winding that produces a feedback signal indicative of a voltage applied by the secondary winding to energize the prime mover; and (iii) a pulse width modulator (PWM) switching control coupled to the multi-winding transformer to receive the feedback signal, said feedback signal causing the PWM switching control to control the DC voltage supplied to the transformer to modulate a pulse width of the voltage in response to the feedback signal such that when energizing the prime mover, the power supply automatically compensates for an AC line voltage that can vary within a range of more than 100 volts, which is provided by connecting the power supply to be energized by the AC line voltage, and wherein a variation in the voltage of the electrical current supplied by the power supply to energize the prime mover is substantially less than ten volts over the full range of the AC line voltage.

6. The haptic gaming device of claim 5, wherein the power supply further includes a secondary rectifier for producing a DC voltage from the voltage on the secondary winding of the transformer.

7. The haptic gaming device of claim 5, wherein the primary winding is coupled to receive an output signal from the full-wave rectifier.

8. The haptic gaming device of claim 5, wherein the object manipulated by a user remains operable to produce the game control signal even if the power supply is not connected to an AC line to receive an AC voltage supplied thereby.

9. The haptic gaming device of claim 5, wherein the power supply includes a filter that filters the electrical current supplied to energize the prime mover.

* * * * *